United States Patent
O'Dowd (10) Patent No.: US 7,353,505 B2
(45) Date of Patent: Apr. 1, 2008

(54) TRACING THE EXECUTION PATH OF A COMPUTER PROGRAM

(75) Inventor: Anthony John O'Dowd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 09/682,520

(22) Filed: Sep. 13, 2001

(65) Prior Publication Data

US 2002/0066080 A1   May 30, 2002

(30) Foreign Application Priority Data

Sep. 16, 2000  (GB) ................... 0022787.6

(51) Int. Cl.
*G06F 9/45* (2006.01)

(52) U.S. Cl. ............... 717/158; 717/154; 717/155; 717/159; 717/130; 717/160; 717/128

(58) Field of Classification Search ........ 717/100–178; 712/236, 237–245; 714/45
See application file for complete search history.

(56) References Cited

U.S. PATENT DOCUMENTS

| | | | |
|---|---|---|---|
| 3,673,573 A | | 6/1972 | Smith |
| 4,176,394 A | | 11/1979 | Kaminski et al. |
| 4,742,466 A | | 5/1988 | Ochiai et al. |
| 5,274,811 A | * | 12/1993 | Borg et al. ................ 717/128 |
| 5,659,679 A | | 8/1997 | Alpert et al. |
| 5,659,752 A | * | 8/1997 | Heisch et al. ............... 717/158 |
| 5,742,804 A | * | 4/1998 | Yeh et al. ................... 712/237 |
| 5,894,575 A | * | 4/1999 | Levine et al. ............... 717/128 |
| 5,941,986 A | * | 8/1999 | Kulkarni .................... 712/245 |
| 6,006,033 A | * | 12/1999 | Heisch ....................... 717/158 |
| 6,115,809 A | * | 9/2000 | Mattson et al. ............. 712/239 |
| 6,173,395 B1 | * | 1/2001 | Wisor et al. ................. 712/236 |
| 6,233,678 B1 | * | 5/2001 | Bala .......................... 712/240 |
| 6,253,338 B1 | * | 6/2001 | Smolders ..................... 714/45 |
| 6,308,322 B1 | * | 10/2001 | Serocki et al. .............. 717/145 |
| 6,351,844 B1 | * | 2/2002 | Bala .......................... 717/128 |
| 6,353,924 B1 | * | 3/2002 | Ayers et al. ................. 717/128 |
| 6,470,492 B2 | * | 10/2002 | Bala et al. .................. 717/128 |
| 6,647,545 B1 | * | 11/2003 | Kurts et al. ................. 717/128 |
| 6,944,797 B1 | * | 9/2005 | Guthrie et al. ................ 714/45 |
| 7,047,521 B2 | * | 5/2006 | Bunnell ....................... 717/130 |
| 7,134,117 B2 | * | 11/2006 | Swaine ........................ 717/128 |
| 2002/0066081 A1 | * | 5/2002 | Duesterwald et al. ....... 717/128 |

FOREIGN PATENT DOCUMENTS

WO    WO 00/46678 A1    8/2000

* cited by examiner

*Primary Examiner*—Lewis A. Bullock, Jr.
(74) *Attorney, Agent, or Firm*—Eustus Dwayne Nelson (57) ABSTRACT

The invention relates to tracing the execution path of a computer program comprising at least one module including a plurality of instructions. At least one of these instructions is a branch instruction. Each branch instruction is identified and evaluated to be one of true and false. An evaluation of true results in a unique identifier being pushed into a predefined area of storage. This unique identifier is associated with the instructions executed as a result of an evaluation of true.

13 Claims, 7 Drawing Sheets

TRACING THE EXECUTION PATH OF A COMPUTER PROGRAM

BACKGROUND OF INVENTION

1. Field of the Invention

The present invention relates to tracing, and more particularly to tracing the execution path of a computer program.

2. Background of the Invention

Computers have proliferated into all aspects of society and increasingly form the backbone of large organisations. When a computer system fails to respond as intended, businesses are invariably unable to provide even the most basic of services. Money, reputation or even lives may be lost, dependant upon the criticality of the service, the outage time etc.

In today's increasingly competitive marketplace, quality is of the utmost concern. Users' expectations are high and thus the reliability of hardware/software is especially important. Customers do not tolerate mistakes and the later a defect is discovered, the more costly it can prove to the manufacturer.

Typically therefore, software developers implement a rigorous testing regime in order to ensure that a product or system is fully operational and consistently performs according to its functional specification, before it is made available to the public.

Software development is however an increasingly complex process. Even using the most rigorous techniques, software developed by people will suffer failures. Most software developers understand this and therefore accept the need to be able to effectively diagnose the cause of such a software failure.

Figure 1:
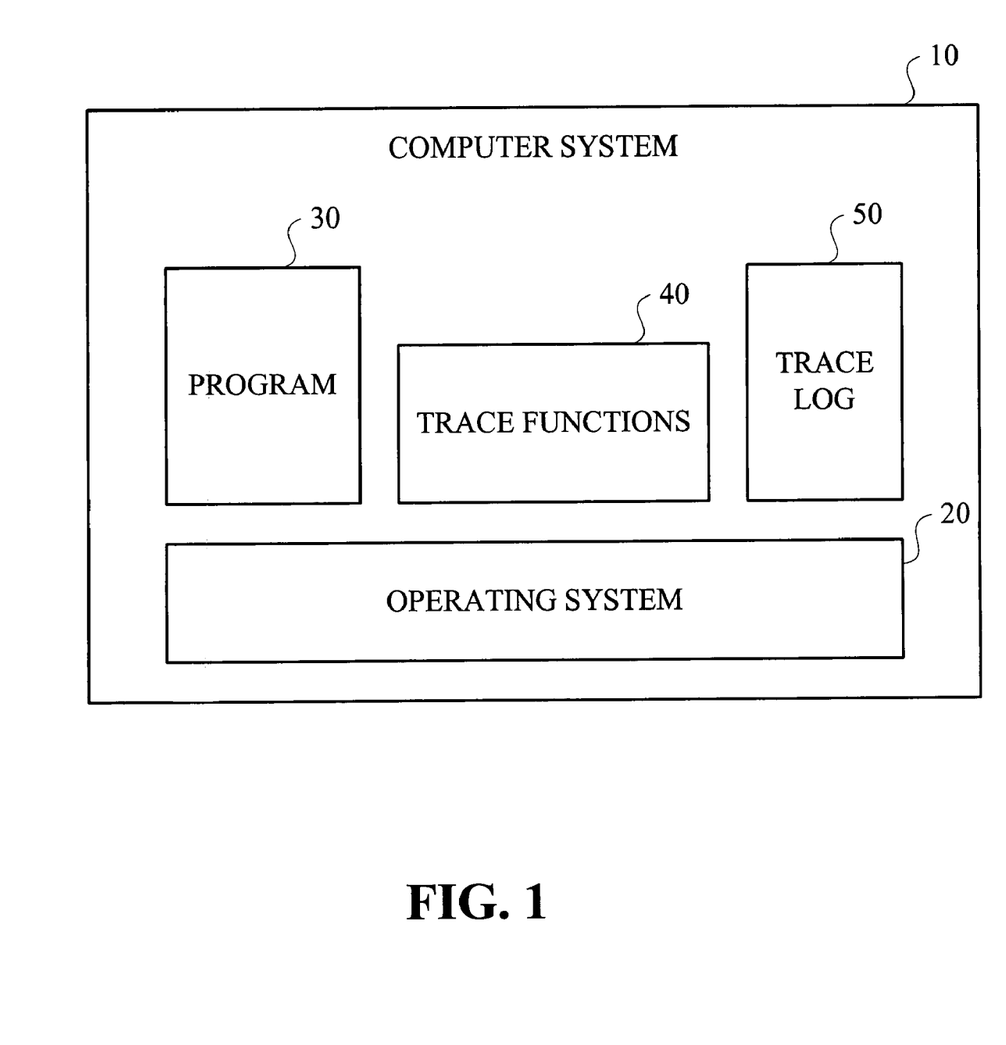
FIG. 1 is a component diagram of a computer system performing tracing according to the prior art.

A most effective technique is known as "tracing". In this technique a program records ("traces") important information that can be used for further analysis after the occurrence of a software failure. FIG. 1 is a component diagram of a computer system performing tracing according to the prior art. A computer system 10, runs an operating system (o/s) 20, which could for example be Windows NT available from Microsoft Corporation. A program 30 executes on top of operating system 20 and may consist of a number of separate modules (not shown), each defining separate functionality. As program 30 executes, it calls various trace functions 40 which are used to record certain information in a trace log 50. Note, although the log is shown as present on the same computer system, computer system 10 may in fact be connected to another machine across a network (neither shown) and the trace log may instead reside on that machine.

Tracing typically occurs at three stages in the processing or executing of a program. These stages are known as the "entry", "exit" and "exception" points of tracing.

The "entry" trace information is gathered when a module obtains control from another module. The information recorded is normally the input values provided to the module.

The "exit" trace information is gathered when a module returns control to a module from which it has previously received control. The information recorded is normally the output values returned to the module from which it obtained control in the first place.

The "exception" trace information is gathered whenever an extraordinary or interesting event occurs within a module after it has been entered but before it has returned control to the module from whom it originally received control. The information gathered is normally information that relates to the exceptional condition that has occurred.

As previously mentioned the entry, exit and exception information is outputted to a trace log. Upon the occurrence of a software failure, a software developer can analyse the trace information in this log. This information can then be used to determine which modules were called and what information was passed between them, including any interesting events that have occurred. This hopefully allows the developer to understand and locate the source of the error and fix it.

Figure 2:
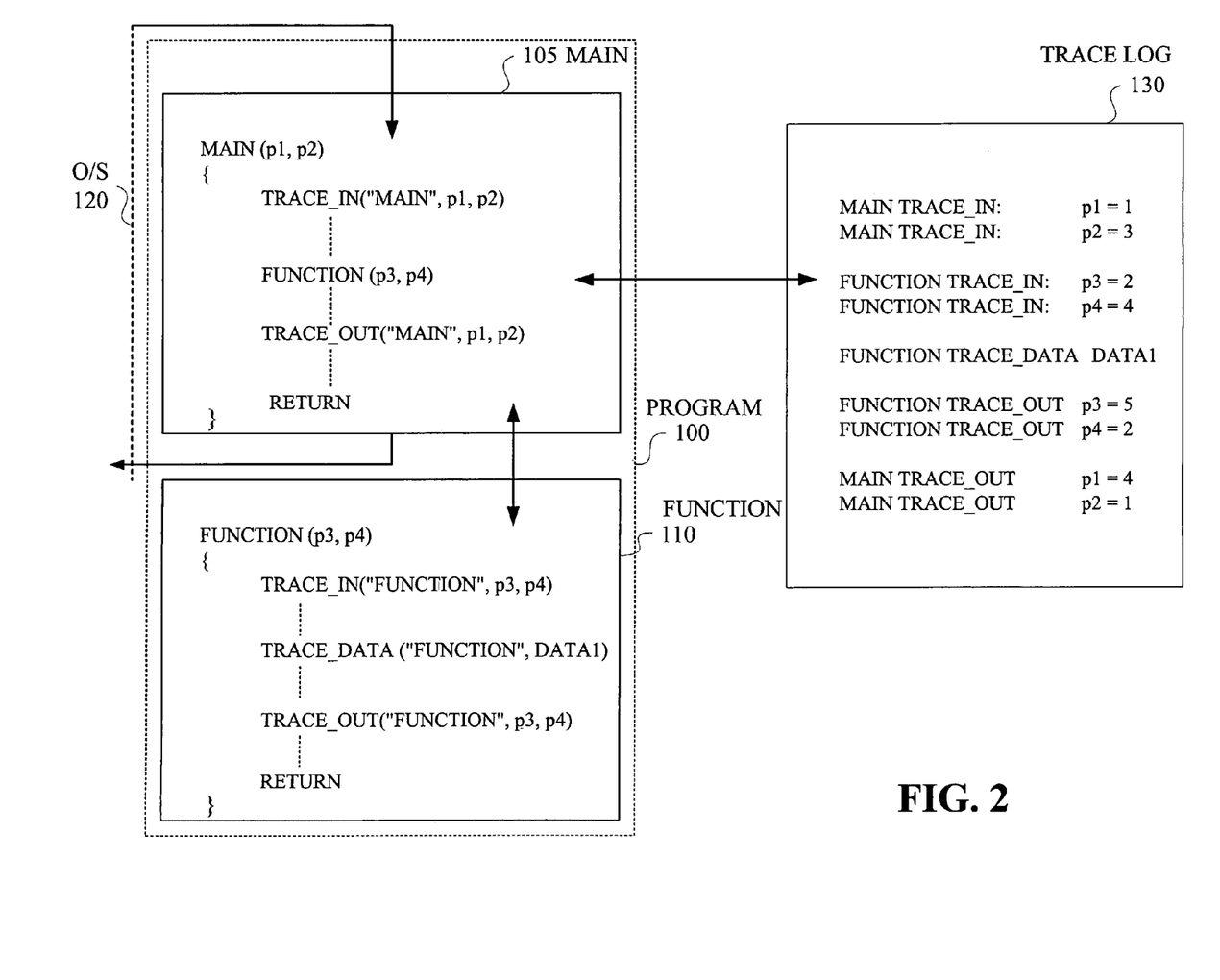
FIG. 2 shows entry, exit and exception tracing according to the prior art.

FIG. 2 shows entry, exit and exception tracing according to the prior art. A program 100 consists of two modules, "Main" 105 and "Function" 110. The program runs on an operating system 120 which initially passes control to Main. Main receives two parameters, p1 and p2 as input. These may be specified by the user from the command-line or be the result of output from another program/module (not shown). Main calls a trace_in function to record entry trace to trace log 130, and a trace_out function to record exit trace to trace log 130.

Trace_in is passed three parameters, "Main", p1, and p2. "Main" is used as an identifier in the trace log such that the values of p1 and p2 can be connected with module Main. It can be seen from the log that parameters p1 and p2 have values of 1 and 3 respectively upon entry to Main. Control is then passed to module FUNCTION 110, which passes parameters p3 and p4 as parameters. FUNCTION performs a trace_in on both p3 and p4, which are identified by the heading "FUNCTION" in trace log 130. It can be seen that p3 has a value of 2 and p4 has a value of 4 upon entry to the module FUNCTION.

A trace_data function writes extraordinary events/events of interest to the trace log. It passes an identifier "FUNCTION" and the data to be read out DATA1, or a number of parameters. This is exception trace.

Module FUNCTION ends and a trace_out function is called passing it the "FUNCTION" identifier, along with parameters p3 and p4. Note, the dotted lines connecting the various trace functions represent calculations and processing performed by the program but not shown (i.e. additional program instructions). It can be seen from trace log 130 that such program instructions have manipulated p3 and p4 such that their values have changed from those initially recorded at trace_in. P3 now equals 5 and p4 equals 2.

As previously mentioned, exit information (via the trace_out function) is recorded prior to a module relinquishing control to the module which originally called it. In this example control is returned to Main 105, additional processing performed (dotted lines) and the trace_out function called. It is passed the "Main" identifier, along with p1 and p2. The trace log once again shows that additional program instructions have manipulated p1 and p2 such that their values are now 4 and 1 respectively. Control is then returned to operating system 120.

Tracing, typically occurring at entry, exit and exception, has a very coarse granularity. It provides very little information as to the path followed during program execution. It is possible to obtain a reasonable level of detail by calling the trace_data function on a regular basis (or whenever anything unusual happens (e.g. the value of a particular parameter is not as expected)), but this is expensive in terms of CPU time. Even on the OS/390 systems (available from IBM Corporation), in which trace information is dumped to fast volatile memory, performance is degraded by approximately 50%. For this reason customers often cannot afford to leave trace running continuously. Thus when a software failure occurs, the operating system often provides call hierarchy (i.e. which modules were called during program execution) but does not provide any more information than that. Time is lost because, trace then has to be turned on and the failure simulated before diagnostics can begin. Customers do not expect these sort of delays. In their eyes, software that they've paid good money for is not supposed to fail.

Not only is tracing expensive in terms of CPU performance, but hand-instrumenting a program with trace instructions is a time consuming job. Knowing the most appropriate points at which to place trace_data statements also requires experience. Trace_in and trace_out statements, on the other hand, always go at the beginning and end of a module respectively.

Even when all the appropriate trace information is captured in a trace log, this information can be difficult to extract. When a module completes, it is only possible to determine which processing occurred within the module by searching for the previous entry trace for that module and examining all the trace entries that this module may have called. This is exceptionally tedious, especially if the flow of control through modules is complex. The situation may be further complicated in a multi-user system where trace records for multiple activities are traced at the same time.

Figure 3:
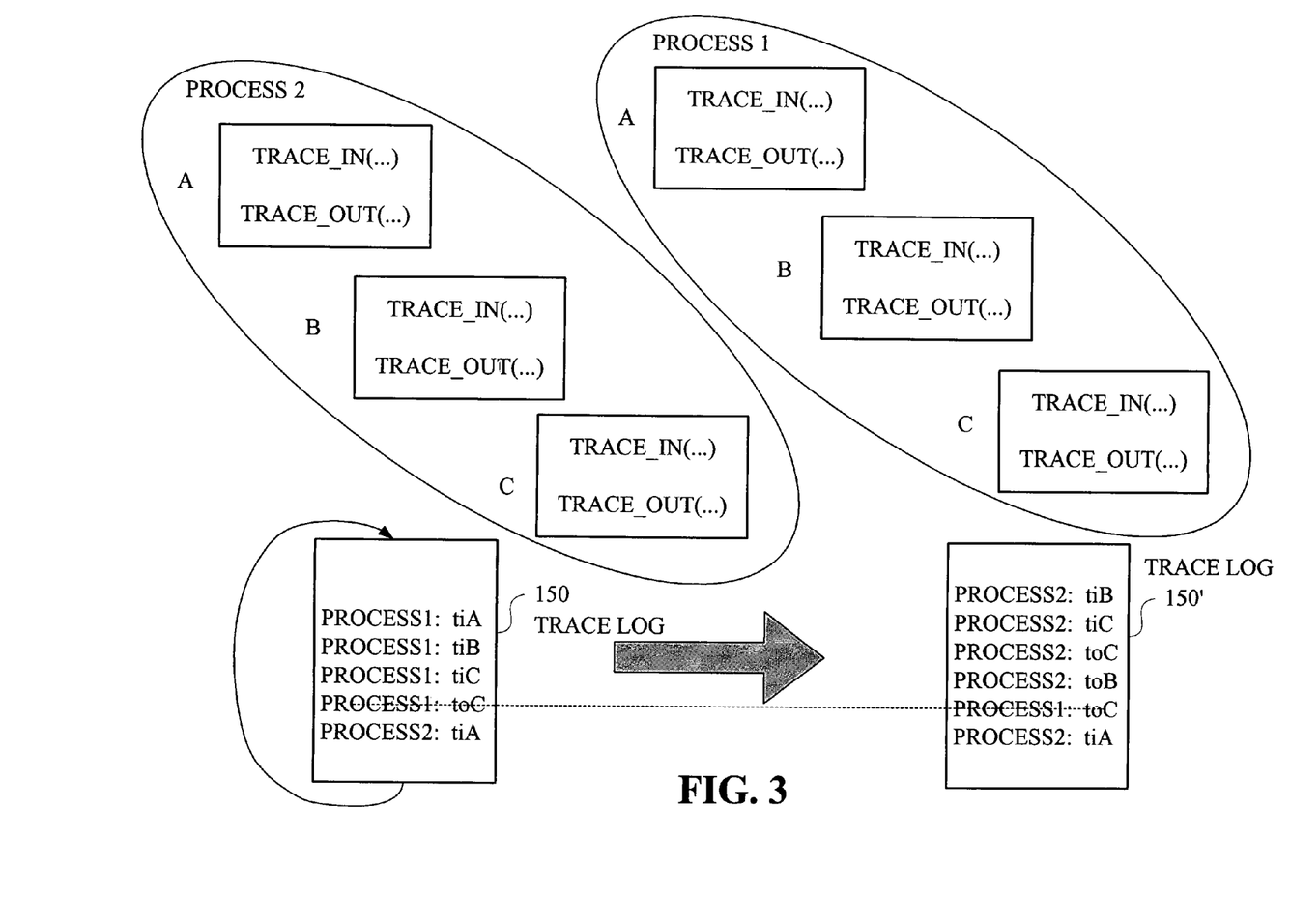
FIG. 3 shows tracing in a multi-user system according to the prior art.

FIG. 3 shows tracing in a multi-user system according to the prior art. A computer system (not shown) runs a Process 1. This includes three program modules A, B and C, each with trace_in and trace_out function calls. Trace Log 150 shows the trace information outputted by process 1. It can be seen that trace_in (ti) is called for all modules. Trace_out (to) is then called for module C. Note, although not shown, the log will in reality contain parameter values for each trace function call (see FIG. 2).

Before trace_out can be called for modules B and A (in that order), process 2 is started. Process 2 also includes three modules, A, B and C, each calling the trace_in and trace_out functions. Thus process 2 dumps the trace_in parameter values for module A out to log 150. This entry fills up the log. New information is thus written to the beginning of the log (shown by the circular arrows). Trace Log 150' shows what happens next. Process 2 runs faster than process 1 and thus it continues to write to the trace log 150' from the top. Process 2 thus outputs trace_in information for its module B, and C. It also dumps trace_out information for its modules C and B. Obviously both processes have not finished outputting information to the trace log 150', but it can be seen that at this point in time all the trace information above the dotted line in trace log 150 for process 1, has been overwritten by process 2. Thus in the event of a software failure, log 150' provides very little help in diagnosing the execution flow taken by process 1. Note, Processes 1 and 2 may be on the same machine or on separate machines.

SUMMARY OF INVENTION

Disclosure of the Invention

Accordingly, the invention provides a method for tracing the execution path of a computer program comprising at least one module including a plurality of instructions, at least one of said instructions being a branch instruction, the method comprising the steps of: identifying each branch instruction; evaluating each branch instruction to be one of true and false; and responsive to an evaluation of true, pushing a unique identifier into a predefined area of storage, wherein said unique identifier is associated with the instructions executed as a result of said evaluation of true.

Preferably, the storage area is in volatile memory and the contents of the storage area is output to non-volatile memory (e.g. a file or trace log) at a predetermined point in time. Alternatively, the storage area itself is non-volatile memory.

In the preferred embodiment trace information is output to the trace log upon exit from the at least one module and the contents of the storage area is output at the same time. Thus the log contains a record of the values of any specified parameters upon exit from the at least one module, as well as a record of the execution path taken through that module.

Since the exit record is the most recent trace record to be written, it is preferably possible to determine the flow through the module even if this is the only trace record available (i.e. the only record that has not been overwritten). Thus the problem addressed with reference to FIG. 3 is addressed. Furthermore, because the contents of the storage area is preferably outputted as one record, it is easy to extract the information from the trace log. The trace log may consist of multiple trace entries interwoven with trace entries from other systems. According to the preferred embodiment, one can easily extract the relevant entry as all the information is held on the one line.

Alternatively, the contents of the storage area is output to the log when the storage area is determined to be full. As yet another alternative, the contents of the storage area is output to the log upon the occurrence of a failure within the program.

In all cases customer satisfaction is increased because the information contained within the storage area can be used to diagnose problems more quickly. The information provides a much greater level of detail than previously possible. It indicates the execution path or flow followed through a program and is especially useful when the program being traced is complex. It provides a valuable insight into the behavior of the program at run-time.

According to the preferred embodiment, the cost of pushing a unique identifier into the storage area upon execution of a particular set of program instructions is trivial. Thus customers can afford to run with trace on continuously so that important problem diagnostics information can be collected in real-time.

Preferably, when the last available space in the storage area has been written, old identifiers are overwritten from the beginning of the area with new values. Thus the storage area can be of a limited size and does not consume an unnecessary amount of resources. A sensible size for the storage area depends upon the complexity of the program being traced.

According to the preferred embodiment, the storage area stores the position at which the last unique identifier was written. Thus it is possible to determine the number of unique identifiers that have been overwritten in the circular storage area, before being outputted to the trace log. If this number is excessively large, the size of the storage area is preferably increased.

In a further aspect, the invention provides an apparatus for tracing the execution path of a computer program comprising at least one module including a plurality of instructions, at least one of said instructions being a branch instruction, said apparatus comprising: means for identifying each branch instruction; means for evaluating each branch instruction to be one of true and false; and means, responsive to an evaluation of true, for pushing a unique identifier into a predefined area of storage, wherein said unique identifier is associated with the instructions executed as a result of said evaluation of true.

In a yet still further aspect, the invention provides a method for instrumenting a computer program comprising at least one module including a plurality of instructions, at least one of said instructions being a branch instruction, each branch instruction being evaluated to be one of true and false at run-time, with at least one signature instruction for indicating the execution path of said program at run-time, the method comprising the steps of: identifying each branch instruction; identifying the instructions associated with an evaluation of true at run-time; instrumenting said instructions associated with an evaluation of true with a signature instruction, wherein said signature instruction causes a unique identifier to be pushed into a predefined area of storage upon execution of said true instructions at run-time.

According to the preferred embodiment, little experience is required to hand-instrument the code, since such signature instructions are always associated with a branch instruction. This is unlike the placing of trace_data statements, which do require more experience. Preferably, it is only as a result of a branch instruction that the execution flow changes. Otherwise, each instruction is executed on a line by line basis.

According to another aspect, the invention provides a compiler for instrumenting a computer program comprising at least one module including a plurality of instructions, at least one of said instructions being a branch instruction, each branch instruction being evaluated to be one of true and false at run-time, with at least one signature instruction for indicating the execution path of said program at run-time, said compiler comprising: means for identifying each branch instruction; means for identifying the instructions associated with an evaluation of true at run-time; means for instrumenting said instructions associated with an evaluation of true with a signature instruction, wherein said signature instruction causes a unique identifier to be pushed into a predefined area of storage upon execution of said true instructions at run-time.

According to the preferred embodiment, automatically instrumenting a program with signature instructions greatly eases the job of the software developer. Detailed program execution flow can be obtained, without the time consuming task of modifying the code by hand.

BRIEF DESCRIPTION OF DRAWINGS

A preferred embodiment of the present invention will now be described, by way of example only, and with reference to the following drawings.

DETAILED DESCRIPTION

Description of the Preferred Embodiments

Figure 4:
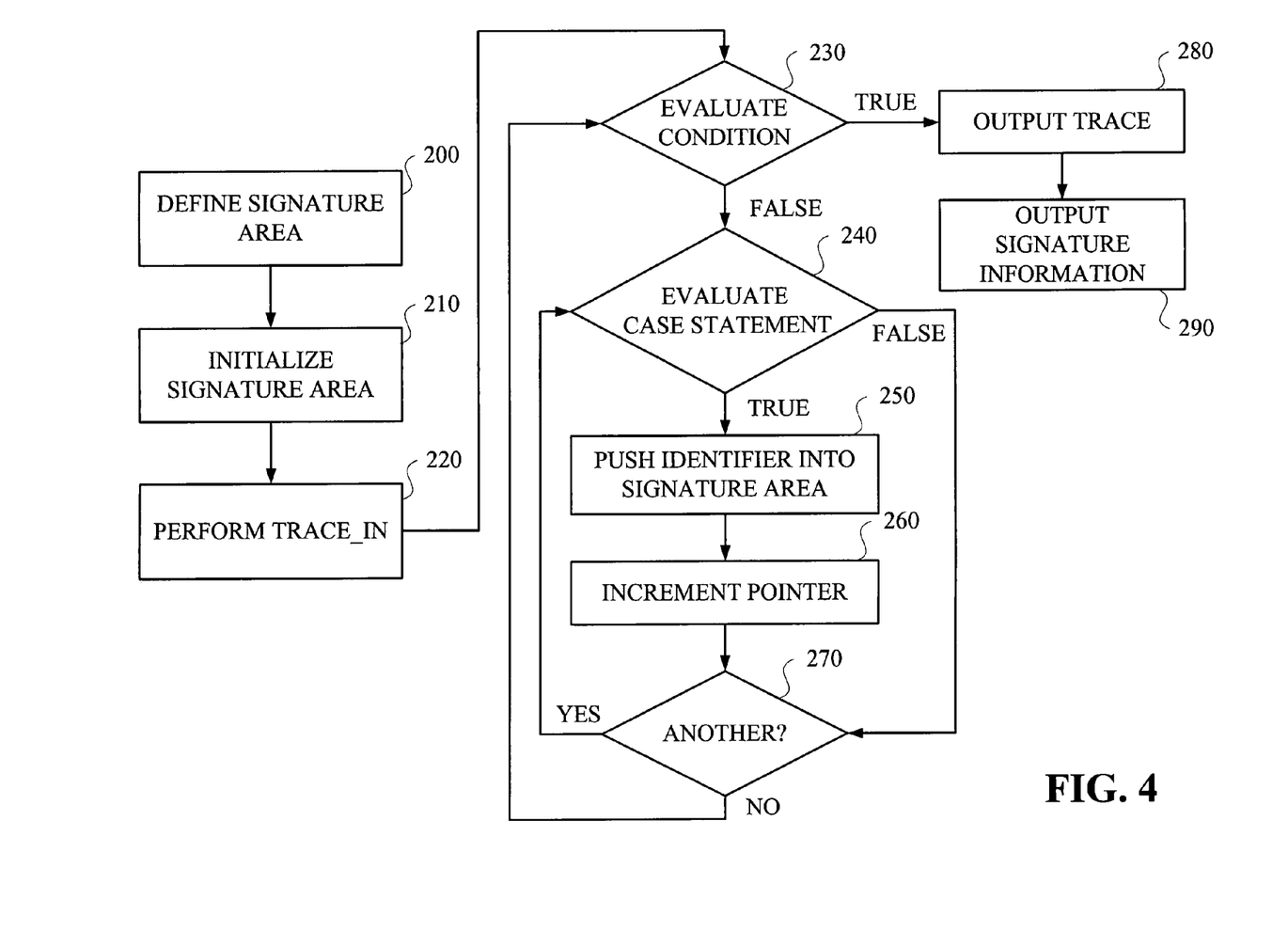
FIGS. 4 and 5 illustrate tracing according to a preferred embodiment of the present invention.
Figure 5:
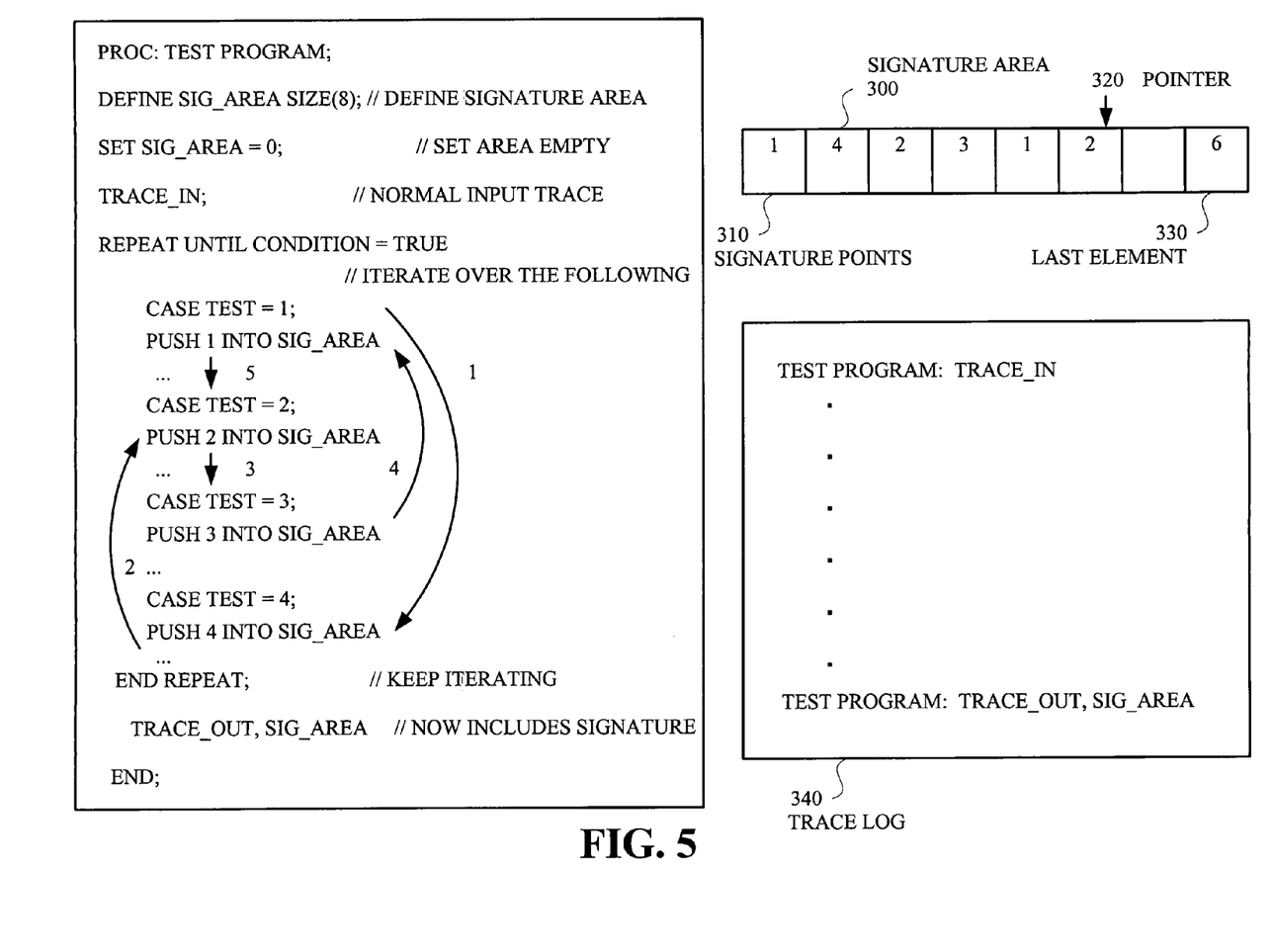

FIGS. 4 and 5 should be read in conjunction with one another. FIG. 5 shows a sample program, "test program", from which execution information is gathered at run-time according to a preferred embodiment of the present invention. FIG. 4 is a flow chart illustrating how the sample program executes in accordance with the preferred embodiment.

Upon execution of the program, a small, fixed size area called a signature area 300 is defined (step 200). In the example, the signature area may contain up to eight signature points 310 (define sig_area size(8)).

Each signature point comprises a unique 4 bit identifier (number). This identifier is, according to the preferred embodiment, used to indicate the execution path or flow followed through the program.

Typically a program executes each instruction line by line, until a decision point or branch instruction is reached. It is at such a point that the program may jump to a specified piece of code (set of instructions) or else ignore that code and continue with subsequent instructions. One example of a branch instruction is an "if statement" (found in most programming languages):

It can be seen from the above that either instructions 1 and 2 are executed, or instruction 3 alone, dependant upon whether "condition"=TRUE or FALSE. There are many other examples of branch instructions (e.g. case tests/statements found in the C programming language) and it is at such points that it is helpful to capture execution flow information. The signature area 300 holds this information.

At step 210 of FIG. 4, the signature area is initialised to 0 (set sig_area=0) (not shown in FIG. 5). In this example, the trace_in function is called as before (step 220), although this does not have to be so. Note, trace_in is passed one or more parameters as previously explained (not shown in FIG. 5).

In the example, the program then loops until a condition evaluates to TRUE (step 230), at which point the program calls the trace_out function (step 280). This function also accepts parameters as previously discussed (not shown). Whilst however the condition evaluates to FALSE, the logic between "repeat until . . . " and "end repeat" is performed. In the example, this logic consists of a number of case statements (branch instructions). A case statement is a Boolean test. In the example, the first case statement evaluates to TRUE when a parameter (not shown)=1, the second case statement evaluates to TRUE when another parameter (not shown)=2, and so on. An evaluation of TRUE results in the code forming part of the current case statement being executed, otherwise the next case statement is evaluated. Thus it will be appreciated that the execution flow through the program will vary dependant upon the evaluation of each case statement.

Thus in accordance with FIG. 4, a case statement is evaluated (step 230). If it evaluates to FALSE, then step 270 checks for another case statement. If there aren't any, then step 230 evaluates the original condition. The program then either loops round again or outputs trace at step 280.

If on the other hand, a case statement evaluates to TRUE at step 240, then an identifier is pushed into the signature area at step 250 (e.g. push 1 into sig_area). Although in the example, this identifier is hard-coded, this need not be the case. The hard-coded numeral may, for example, be replaced with a variable, initially set to 0 and then incremented each time a push into the signature area is made. A pointer 320 keeps note of the current position in the signature area. Having pushed a unique identifier into this signature area, the pointer is incremented at step 260.

According to the preferred embodiment, signature points are added into the signature area from left to right (Note, this does not have to be the case and other variations are considered within the spirit of the invention). In the example, the seven most recent signature points are held in the signature area. These are used to track the execution flow through the program. The purpose of the last element 330 will be explained later.

In the example, case statement 1 is evaluated to TRUE first such that 1 is pushed into the signature area. Execution then jumps to case statement 4 (i.e. case statements 2 and 3 evaluate to false)(arrow 1); case statement 2 (arrow 2); case statement 3 (arrow 3); case statement 1 (arrow 4); and finally case statement 2 (arrow 5). It can be seen that the corresponding identifiers have been pushed into the signature area (1; 4; 2; 3; 1; 2). These numbers indicate which set of instructions have been executed at run-time and in what order.

According to the preferred embodiment, when the program or module finishes, trace is output to trace log 340 as before (step 280). Additionally the information contained within the signature area is also output to the trace log (step 290). The signature information provides valuable insight into the behavior of the program. Should the program fail or behave erroneously, then the signature points can be used in subsequent problem diagnostics.

According to the preferred embodiment, once the signature area 300 is full, old signature points are overwritten. Note, according to the preferred embodiment signature information is only written out to the trace log along with a trace exit record (i.e. at the end of the module/program). If a module/program is particularly complex, then the signature area may not be large enough. Thus signature points may be overwritten before they are recorded in the trace log. The last element 330 holds the number of the last signature point that is written (6). It is possible to determine from this number how much signature information is missing as a result of being overwritten. For example, if a signature point is written into element 7, this fills the signature area. A subsequent signature point is thus written into the first element of the signature area. Last element 330 is then updated to read 1. It is thus possible to determine that the first element in the signature area has been overwritten before being outputted to the trace log (i.e. it is possible to determine that this information is missing). If a large number of signature points are continually overwritten before being recorded in the trace log, then a larger signature area can be defined. In an alternative embodiment, the signature information is written straight out to the trace log every time the signature area is filled.

For many modules it is sufficient to have a small number (e.g. 15) of signature points and a signature area limited to 32 bits (i.e. 4 bits per signature point, making 8 signature points). The push operation usually becomes two low-level instructions (a SHIFT followed by an OR). Therefore, for all practical purposes, the implementation cost is negligible. Even for larger signature areas and more signature points, a trivial marginal processing overhead is required. Thus a simple and efficient determination of module processing is provided. As a result, customers can afford to run with a more detailed trace (i.e. than that provided by the trace_in and trace_out functions) on continuously.

As previously mentioned, according to the preferred embodiment, the signature information is always written out with the exit trace record (i.e. the trace_out data). Since the exit trace record is the most recent trace record to be written, it is possible to determine the flow through the module even if this is the only trace record available (i.e. the only record that has not been overwritten). Thus the problem discussed with reference to FIG. 3 is addressed.

Figure 6:
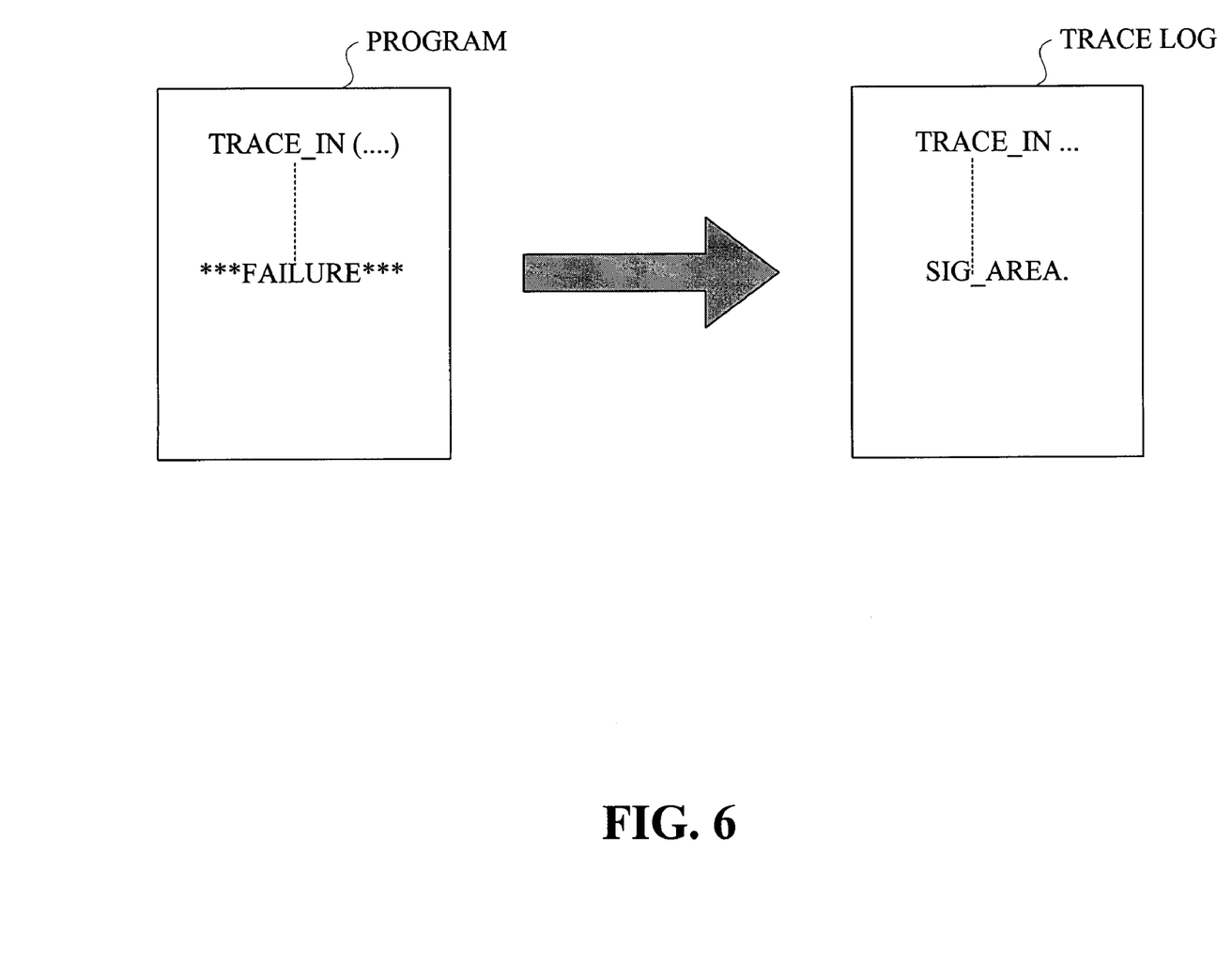
FIG. 6 shows the process of outputting signature information at the first point of failure according to a preferred embodiment of the present invention.

In an alternative embodiment, the signature information is outputted to the trace log at the point of failure (see FIG. 6). This is useful in the situation where a failure causes the program/module to loop indefinitely and thus never output that extremely helpful exit record. Furthermore, customer satisfaction is increased since problems can be diagnosed much more quickly. There is no need to instrument the program with the more detailed trace$_{data}$ statements, which takes time and experience. Instead data is captured upon a first failure and technicians can set about solving the problem immediately. Of course outputting the signature information also increases customer satisfaction because it too decreases the time taken to solve a software failure.

In one embodiment a program's code is hand-instrumented with instructions that enable a signature point to be pushed into the signature area. Note, as previously mentioned, such signature points are preferably only required at points where the code branches. Thus less experience is needed to determine where to place the signature points. This is unlike the placing of the trace_data statements, which do require more experience. According to an alternative embodiment, the code is automatically instrumented with such instructions at compile-time.

Figure 7:
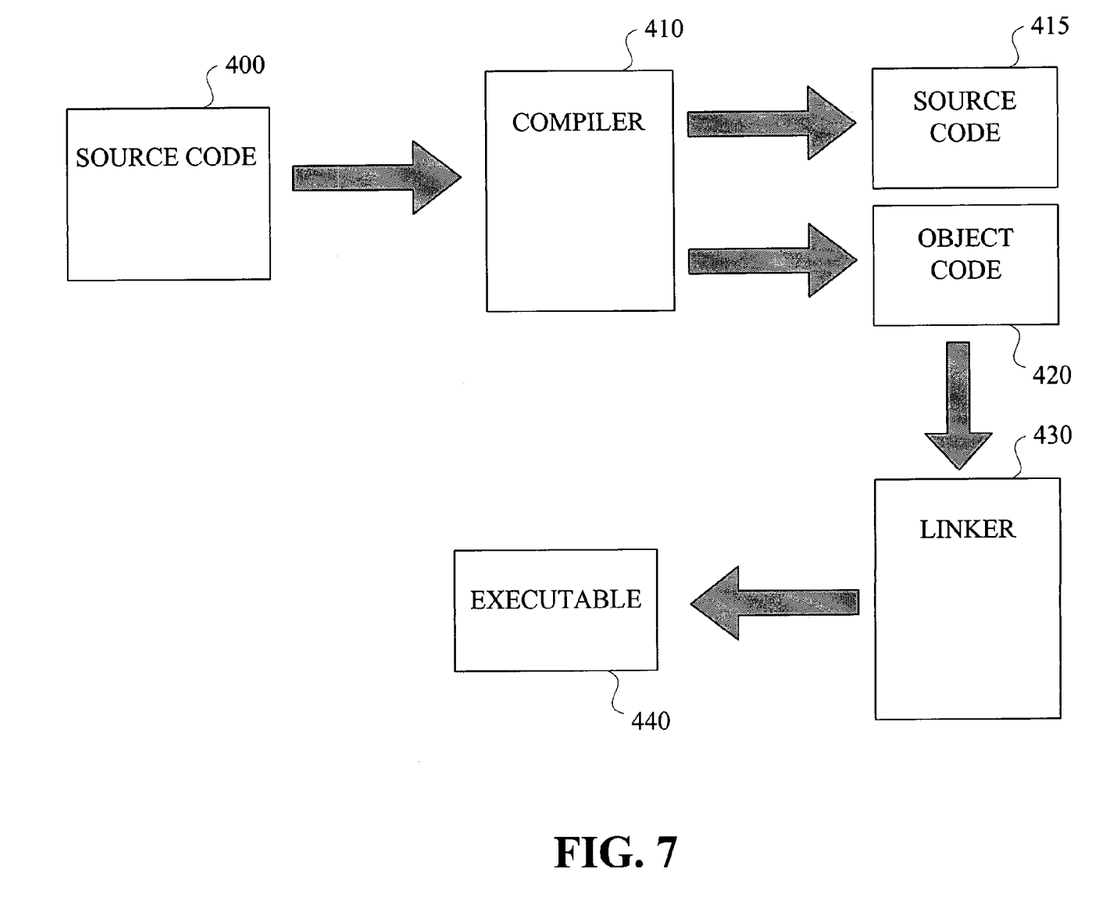
FIG. 7 shows the operation of a compiler in accordance with a preferred embodiment of the present invention.

FIG. 7 shows the operation of a compiler in accordance with a preferred embodiment of the present invention. A compiler 410 is provided with a program's source code 400 as input. The compiler processes this source code to produce object code 420. A listing of the source code 415 can also be produced at this stage. The object code is then passed to a linker 430 which uses this code 420 to produce an executable 440.

Typically, there are three stages to the compilation process: lexical analysis; syntax analysis; and code generation. During the lexical analysis, symbols (e.g. alphabetic characters) are grouped together to form tokens. For example the characters P R I N T are grouped to form the command (token) PRINT. In some systems, certain key words are replaced by shorter, more efficient tokens. This part of the compilation process also verifies that the tokens are valid. Next, the syntax analyser checks whether each string of tokens forms a valid sentence. Finally, the code generation stage produces the appropriate object code.

The syntax analyser is able to identify branch instructions in a program's source code. According to the alternative embodiment, the compiler is modified to instrument the code with instructions for pushing a signature point into a defined signature area after each occurrence of a branch instruction. By allowing the compiler to automatically instrument the code at compile-time, the job of the software developer is greatly eased. Detailed execution flow information can be obtained, without the time consuming task of modifying the code by hand. Preferably, the compiler also instruments the code with an instruction to define the size of the signature area and an instruction to write the signature information out to a trace log at the appropriate point (any one of those discussed above).

According to the alternative embodiment, source code is compiled with one or both of two compiler switches set. The first switch determines whether the code is automatically instrumented with signature points or not, and the second switch allows a user to modify the size of the signature area. If the program being traced is particularly complex, then the size of the signature area may need to be increased.

The invention claimed is:

1. A method for tracing the execution path of a computer program comprising at least one module including a plurality of instructions, at least one of said instructions being a branch instruction, the method comprising the steps of:
   instrumenting the computer program with instructions for defining the size of a predefined area of storage and instructions for outputting the contents of the storage area to a file at a predetermined period of time irrespective to the completion or non-completion of the trace;
   tracing the execution path of the computer program by:
      automatically identifying each branch instruction of the computer program;
      evaluating each branch instruction to be one of true and false; and
      responsive to an evaluation of true, automatically pushing at least one unique identifier into a said predefined area of storage, wherein said at least one unique identifier directly references a set of instructions executed as a result of said evaluation of true;
   and responsive to a determination that a plurality of unique identifiers in said predefined area of storage have been overwritten. re-instrumenting the instruction defining the size of the storage area to increase the size of the predefined area.

2. The method of claim 1, further comprising the step of: providing said predefined area of storage with volatile memory.

3. The method of claim 1, further comprising the step of: providing said predefined area of storage with non-volatile memory.

4. The method of claim 1, further comprising the step of: outputting trace information to said file upon exit from said at least one module.

5. The method of claim 4, further comprising the step of outputting the contents of said storage area at the same time as said exit trace information.

6. The method of claim 1, wherein the step of outputting the contents of said storage area further comprises the step of:
   determining whether said storage area is full; and
   responsive to a positive determination, outputting said contents to said file.

7. The method of claim 1, wherein the step of outputting the contents of said storage area further comprises the step of:
   determining whether a failure has occurred within said program; and
   responsive to a positive determination, outputting said contents to said file.

8. The method of claim 1, wherein the step of pushing a unique identifier into a predefined area of storage further comprises the steps of:
   determining whether said predefined area of storage is full; and
   overwriting the first unique identifier in said storage area.

9. The method of claim 8, further comprising the step of determining that a plurality of unique identifiers have been overwritten comprises the step of:
   writing the position of the most recent unique identifier to be written out to said storage area to said storage area.

10. The method of claim 9, further comprising the step of determining that a plurality of unique identifiers have been overwritten comprises the step of:
   using said position to determine the number of unique identifiers that have been overwritten prior to be written out to said file.

11. An apparatus stored on a computer system for tracing the execution path of a computer program comprising at least one module including a plurality of instructions, at least one of said instructions being a branch instruction, said apparatus comprising:
   a compiler for instrumenting the computer program with instructions for defining the size of a predefined area of storage and instructions for outputting the contents of the storage area to a file at a predetermined period of time irrespective to the completion or non-completion of the trace; wherein said compiler traces the execution path of the computer program, and comprises of:
      an identifier for automatically identifying each branch instruction of the computer program;
      an evaluator for evaluating each branch instruction to be one of true and false; and
      a pusher, responsive to an evaluation of true, for automatically pushing at least one unique identifier into a predefined area of storage, wherein said at least one unique identifier directly references a set of instructions executed as a result of said evaluation of true;
   and an evaluator responsive to a determination that a plurality of unique identifiers in said predefined area of storage have been overwritten, re-instrumenting the instruction defining the size of the storage area to increase the size of the predefined area.

12. A method for instrumenting a computer program comprising at least one module including a plurality of instructions, at least one of said instructions being a branch instruction, each branch instruction being evaluated to be one of true and false at run-time, with at least one signature instruction for indicating the execution path of said program at run-time, the method comprising the steps of:
   automatically identifying each branch instruction;
   identifying at least one set of instructions associated with an evaluation of true to the identified branch instruction at run-time;
   instrumenting the computer program with instructions for defining the size of a predefined area of storage and instructions for outputting the contents of the storage area to a file at a predetermined period of time irrespective to the completion or non-completion of a trace;
   instrumenting said at least one set of instructions associated with an evaluation of true with at least one signature instruction, wherein said at least one signature instruction causes at least one unique identifier to be pushed into said predefined area of storage at run-time, and wherein said at least one unique identifier directly references said at least one set of instructions associated with an evaluation of true
   re-instrumenting the instruction defining the size of the storage area to increase the size of the predefined area responsive to a determination that a plurality of unique identifiers in said predefined area of storage have been overwritten.

13. A compiler executing on a computer system for instrumenting a computer program comprising at least one module including a plurality of instructions, at least one of said instructions being a branch instruction, each branch instruction being evaluated to be one of true and false at runtime, with at least one signature instruction for indicating the execution path of said program at run-time, said compiler comprising:

a first pusher for instrumenting the computer program with instructions for defining the size of a predefined area of storage and instructions for outputting the contents of the storage area to a file at a predetermined period of time irrespective to the completion or non-completion of a trace a first identifier for automatically identifying each branch instruction of the computer program;

a second identifier for identifying the instructions associated with an evaluation of true of the branch instruction at run-time;

a second pusher for instrumenting said instructions associated with an evaluation of true of the branch instruction with a signature instruction, wherein said signature instruction causes a unique identifier to be pushed into said predefined area of storage upon evaluation of true to said branch instructions at run-time, and wherein said at least one unique identifier directly references said at least one instruction associated with an evaluation of true a third pusher for re-instrumenting the instruction defining the size of the storage area to increase the size of the predefined area responsive to a determination that a plurality of unique identifiers in said predefined area of storage have been overwritten.

* * * * *